(12) United States Patent
Arai et al.

(10) Patent No.: US 12,031,191 B2
(45) Date of Patent: Jul. 9, 2024

(54) GRAIN-ORIENTED ELECTRICAL STEEL SHEET AND METHOD FOR MANUFACTURING SAME

(71) Applicant: NIPPON STEEL CORPORATION, Tokyo (JP)

(72) Inventors: Satoshi Arai, Tokyo (JP); Hideyuki Hamamura, Tokyo (JP); Kazutoshi Takeda, Tokyo (JP); Takeo Aramaki, Tokyo (JP); Hirotoshi Tada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 151 days.

(21) Appl. No.: 17/415,816

(22) PCT Filed: Dec. 24, 2019

(86) PCT No.: PCT/JP2019/050582
§ 371 (c)(1),
(2) Date: Jun. 18, 2021

(87) PCT Pub. No.: WO2020/138069
PCT Pub. Date: Jul. 2, 2020

(65) Prior Publication Data
US 2022/0042136 A1    Feb. 10, 2022

(30) Foreign Application Priority Data

Dec. 28, 2018  (JP) .................................. 2018-248167

(51) Int. Cl.
*H01F 1/147*  (2006.01)
*C21D 3/04*  (2006.01)
(Continued)

(52) U.S. Cl.
CPC ................. *C21D 9/46* (2013.01); *C21D 3/04* (2013.01); *C21D 8/005* (2013.01); *C21D 8/1222* (2013.01);
(Continued)

(58) Field of Classification Search
None
See application file for complete search history.

(56) References Cited

U.S. PATENT DOCUMENTS 4,775,430 A * 10/1988 Tanaka ................. C21D 8/1283
148/113
5,411,604 A    5/1995 Inokuti et al.
(Continued)

FOREIGN PATENT DOCUMENTS

| EP | 0 959 142 A2 | 11/1999 |
| JP | 57-9631 B2 | 2/1982 |

(Continued)

OTHER PUBLICATIONS

Kuroki et al., "Application of artificial domain control", J. Appl. Phys., Mar. 1981, vol. 52, No. 3, pp. 2422-2424.

*Primary Examiner* — Kim S. Horger
(74) *Attorney, Agent, or Firm* — Birch, Stewart, Kolasch & Birch, LLP (57) ABSTRACT

This grain-oriented electrical steel sheet includes a base steel sheet, a forsterite-based primary film disposed on a surface of the base steel sheet, and a phosphate-based tension-imparting film containing no chromium, which is disposed on a surface of the primary film. In a case where a Ti content and a S content are respectively expressed as XTi and XS, (Continued)

by mass %, the forsterite-based primary film satisfies Expression (1) and Expression (2). A strain-introduced magnetic domain control is performed on the grain-oriented electrical steel sheet $$0.10 \leq X_{Ti}/X_S \leq 10.00 \quad \text{Expression (1)}$$

$$X_{Ti}+X_S \geq 0.10 \text{ mass \%.} \quad \text{Expression (2)}$$

2 Claims, 2 Drawing Sheets

(51) Int. Cl.
  *C21D 8/00* (2006.01)
  *C21D 8/12* (2006.01)
  *C21D 9/46* (2006.01)
  *C23C 22/07* (2006.01)
  *C23C 22/82* (2006.01)

(52) U.S. Cl.
  CPC ......... *C21D 8/1233* (2013.01); *C21D 8/1288* (2013.01); *C23C 22/07* (2013.01); *C23C 22/82* (2013.01); *H01F 1/147* (2013.01)

(56) References Cited

U.S. PATENT DOCUMENTS

| | | |
|---|---|---|
| 2009/0047537 A1 | 2/2009 | Nanba et al. |
| 2010/0055481 A1 | 3/2010 | Kubo et al. |
| 2018/0202018 A1 | 7/2018 | Imamura et al. |

FOREIGN PATENT DOCUMENTS

| | | |
|---|---|---|
| JP | 58-26406 B2 | 6/1983 |
| JP | 3023242 B2 | 3/2000 |
| JP | 2000-169972 A | 6/2000 |
| JP | 2000-169973 A | 6/2000 |
| JP | 2000-178760 A | 6/2000 |
| JP | 2012-214902 A | 11/2012 |
| JP | 6031951 B2 | 11/2016 |
| JP | 6354957 B2 | 7/2018 |
| WO | WO 2008/062853 A1 | 5/2008 |
| WO | WO 2013/175733 A1 | 11/2013 |
| WO | WO 2014/121853 A1 | 8/2014 |

\* cited by examiner

ROLLING DIRECTION

FIG. 3

GRAIN-ORIENTED ELECTRICAL STEEL SHEET AND METHOD FOR MANUFACTURING SAME

TECHNICAL FIELD OF THE INVENTION

The present invention relates to a grain-oriented electrical steel sheet and a method for manufacturing the same. Specifically, the present invention relates to a grain-oriented electrical steel sheet that has a tension-imparting film containing no chromium and has undergone a strain-introduced magnetic domain control and a method for manufacturing the same.

The present application claims priority based on Japanese Patent Application No. 2018-248167 filed in Japan on Dec. 28, 2018, the content of which is incorporated herein by reference.

RELATED ART

Grain-oriented electrical steel sheets are used as iron core materials for transformers. In ordinary grain-oriented electrical steel sheets, a base steel sheet contains Si, crystal grains in the base steel sheet are piled up in an orientation (Goss orientation) where a {110} plane is aligned parallel to the steel sheet surface and a <100> axis is aligned in the rolling direction, and the magnetization easy axis is aligned in the longitudinal direction.

Ordinary grain-oriented electrical steel sheets have a structure where a plurality of magnetic domains (stripe magnetic domains) in which magnetization is oriented in the rolling direction are arranged across a magnetic domain wall. These magnetic domain walls are 180° magnetic domain walls and grain-oriented electrical steel sheets are easily magnetized in the rolling direction. Therefore, ordinary grain-oriented electrical steel sheets have a high magnetic flux density at a relatively small constant magnetization force and a low iron loss.

As the index of the iron loss, W17/50 [W/kg] is ordinarily used. W17/50 refers to a value of iron loss generated in a grain-oriented electrical steel sheet when excited with an alternating-magnetization such that the maximum magnetic flux density becomes 1.7 T at a frequency of 50 Hz. The reduction of this W17/50 enables the manufacturing of transformers having a higher efficiency.

The outline of ordinary methods for manufacturing grain-oriented electrical steel sheets will be described below. A silicon steel sheet containing a predetermined amount of Si that has undergone hot rolling (hot-rolled steel sheet) is subjected to hot-rolled sheet annealing and cold rolling, thereby obtaining a cold-rolled steel sheet having a desired sheet thickness. Next, in a continuous annealing furnace, the cold-rolled steel sheet is annealed and subjected to decarburization and primary recrystallization (grain size: 7 to 30 μm) (decarburization-annealing), thereby obtaining a decarburization-annealed steel sheet. Subsequently, an annealing separating agent containing MgO as a main component is applied to a surface of a decarburization-annealed steel sheet (hereinafter, simply referred to as a steel sheet in some cases), and the steel sheet is coiled into a coil shape (the outer shape is cylindrical) and subjected to final annealing.

In this final annealing, so-called Goss grains in which the rolling direction and the magnetization easy axis coincide with each other due to a secondary recrystallization phenomenon preferentially crystal-grow. As a result, a grain-oriented electrical steel sheet having high crystal orientation properties (crystal orientation) can be obtained by performing final annealing. In order to enhance the pile-up of Goss orientations, a secondary recrystallization process where AlN, MnS, or the like is used as an inhibitor is widely used.

In addition, in the final annealing step, the annealing separating agent applied to the surface of the steel sheet (decarburization-annealed steel sheet) and a surface oxide film formed by decarburization-annealing are fired, and a primary film (forsterite film) is formed. After final annealing, the coil is uncoiled, the steel sheet is continuously threaded into a separate annealing furnace and subjected to flattening annealing, and the correction of the steel sheet shape generated by final annealing and the removal of unnecessary strains in the steel sheet are performed. Furthermore, a coating liquid is applied and baked on the surface of the steel sheet, whereby a tension-imparting film that imparts tension and electrical insulation properties is formed, and a grain-oriented electrical steel sheet is obtained.

The formation of the film on the surface of the steel sheet is one of the approaches for reducing iron loss. The primary film is formed on a surface of the steel sheet in order to impart tension to the steel sheet and reduce the iron loss of the steel sheet as a single sheet. In addition, the tension-imparting film is provided on the outer layer side of the primary film and is formed in order not only to reduce the iron loss as a single sheet of the steel sheet by imparting tension to the steel sheet, but also to reduce the iron loss as an iron core by securing electrical insulation properties between the steel sheets at the time of laminating the steel sheets and using the laminate.

Ordinarily, the primary film contains forsterite ($Mg_2SiO_4$) as a main component. This primary film is formed of the annealing separating agent containing magnesia (MgO) as a main component and the surface oxide film (main component: $SiO_2$) on the base steel sheet that react with each other in a process of a heat treatment performed at 1000° C. to 1200° C. for 5 to 50 hours during final annealing where secondary recrystallization is caused in the steel sheet. In addition, ordinarily, the tension-imparting film contains chromium. This tension-imparting film is formed by applying a coating liquid containing, for example, phosphoric acid or phosphate, colloidal silica, and chromic anhydride or chromate to the steel sheet after final annealing and baking and drying the coating liquid at 700° C. to 1000° C. for 5 to 120 seconds.

Regarding the primary film, a technique for improving the film characteristics such as the exfoliation resistance or insulation properties of the primary film by adding a Ti compound such as Ti oxide and/or Ti hydroxide to the annealing separating agent containing MgO is known.

A technique described in Patent Document 1 has been made in consideration of the following problem: in the manufacturing of a grain-oriented electrical steel sheet using a material containing no inhibitor-forming component after decarburization-annealing and final (purification) annealing, when final annealing is performed using an annealing separating agent containing MgO and containing a Ti compound such as Ti oxide or Ti hydroxide, favorable magnetic characteristics cannot be obtained, and, particularly, the magnetic characteristics after wound significantly deteriorate.

Patent Document 1 describes a grain-oriented electrical steel sheet, in which the composition of a base metal from which a forsterite film is removed contains C: 0.0050 mass % or less, Si: 2.0 to 8.0 mass %, and Mn: 0.005 to 1.0 mass %, the remainder consists of Fe and unavoidable impurities, and, when the amount of Ti (mass %) and the amount of N (mass %) that are contained in the base metal from which a forsterite film is removed are represented by Ti (a) and N (a), respectively, and the amount of Ti (mass %) and the amount of N (mass %) that are contained in the steel sheet having a forsterite film are represented by Ti (b) and N (b), respectively, N (b)≤0.0050 mass %, N (b)/N (a)≥4, and Ti (b)/Ti (a)≥4 are satisfied.

In addition, Patent Document 1 describes the use of an annealing separating agent in which 0.5 to 10 parts by mass of a Ti compound in terms of $TiO_2$ is added to 100 parts by mass of MgO as the annealing separating agent for forming the forsterite film.

As the tension-imparting film, tension-imparting films containing chromium as described above have been ordinarily used; however, in response to the growing interest in environment preservation in recent years, there is a desire for a tension-imparting film containing no chromium.

Patent Document 2 describes the formation of an insulating coating (tension-imparting film) containing no chromium using a coating liquid made up of colloidal silica, aluminum phosphate, boric acid, and sulfate.

Patent Document 3 intends to propose a grain-oriented electrical steel sheet that, even in the case of applying a film containing no chromium as a tension film, has achieved the same level of high moisture absorption resistance and low iron loss as in the case of applying a chromium-containing film.

Patent Document 3 describes a grain-oriented electrical steel sheet including a forsterite-based base film and a phosphate-based tension-imparting film containing no chromium on a surface of a steel sheet, in which the tension-imparting film is obtained by applying and baking a phosphate-based coating treatment liquid containing no chromium on a surface of the forsterite-based base film caused to contain 0.02 $g/m^2$ or more and 0.20 $g/m^2$ or less of Mn in terms of a basis weight and 0.01 $g/m^2$ or more and 0.10 $g/m^2$ or less of S in terms of a basis weight after final annealing.

Patent Document 3 describes that, in order to form the forsterite-based base film containing Mn and S in terms of the above-described basis weights, an annealing separating agent is caused to contain, as a S-containing additive, a total of 1.5% or more and 20% or less of one or more selected from sulfates or sulfides of Mg, Ca, Sr, Ba, Na, K, Mn, Fe, Cu, Sn, Sb, and Ni in terms of the $SO_3$ amount.

Additionally, as a method for forming a tension-imparting film containing no chromium, Patent Document 4 describes a method in which an oxide colloid is added to a coating liquid containing primary phosphate and colloidal silica. Patent Document 5 describes a method in which a boron compound is added to a coating liquid containing primary phosphate and colloidal silica. Patent Document 6 describes a method in which a metal organic acid salt is added to a coating liquid containing primary phosphate and colloidal silica.

Regarding the reduction of the iron loss of grain-oriented electrical steel sheets, another approach for reducing the iron loss with a film is also being studied.

In grain-oriented electrical steel sheets, it is possible to further reduce the iron loss by imparting strains that linearly extend or are intermittently aligned at constant cycles (at regular intervals) in a direction perpendicular or substantially perpendicular to the rolling direction (conveyance direction) and refining magnetic domains. In this case, a closure-type magnetic domain where the rolling direction and magnetization are orthogonal to each other is formed due to a local strain, and the magnetic domain wall spacing in a substantially rectangular stripe magnetic domain (the width of the stripe magnetic domain) becomes narrow due to an increase in energy in the magnetic domain as a source. Since the eddy-current loss, which is one of the component elements of the iron loss (W17/50), has a positive correlation with the spacing of a 180° magnetic domain wall, based on this principle, it is possible to reduce the iron loss by performing a so-called strain-introduced magnetic domain control on the grain-oriented electrical steel sheet.

As a method for the strain-introduced magnetic domain control, for example, Patent Document 7 describes a method of using laser irradiation, Patent Document 8 describes a method of using electron beam heating, and Non-Patent Document 1 describes a method by ballpoint pen scribing.

PRIOR ART DOCUMENT

Patent Document

[Patent Document 1] Japanese Patent No. 6354957
[Patent Document 2] Japanese Examined Patent Application, Second Publication No. S57-9631
[Patent Document 3] Japanese Patent No. 6031951
[Patent Document 4] Japanese Unexamined Patent Application, First Publication No. 2000-169972
[Patent Document 5] Japanese Unexamined Patent Application, First Publication No. 2000-169973
[Patent Document 6] Japanese Unexamined Patent Application, First Publication No. 2000-178760
[Patent Document 7] Japanese Examined Patent Application, Second Publication No. S58-26406
[Patent Document 8] Japanese Patent No. 3023242

Non-Patent Document

[Non-Patent Document 1] K. Kuroki et. al. J. Appl. Phys 52(3), (1981) 2422-2424i

DISCLOSURE OF THE INVENTION

Problems to be Solved by the Invention

The present inventors attempted to perform a strain-introduced magnetic domain control on a grain-oriented electrical steel sheet provided with a primary film containing forsterite as a main component and a tension-imparting film containing no chromium on a surface of a base steel sheet.

However, through this attempt, the present inventors newly discovered a problem in that, in the case of performing a strain-introduced magnetic domain control on the grain-oriented electrical steel sheet having the tension-imparting film containing no chromium, compared with the case of performing a strain-introduced magnetic domain control on a grain-oriented electrical steel sheet having a tension-imparting film containing chromium, the iron loss reduction effect is not sufficient.

An object of the present invention is to provide a grain-oriented electrical steel sheet having a tension-imparting film containing no chromium in which the iron loss is effectively reduced by performing a strain-introduced magnetic domain control and a preferable method for manufacturing the grain-oriented electrical steel sheet.

Means for Solving the Problem

The gist of the present invention is as described below.

[1] A grain-oriented electrical steel sheet according to one aspect of the present invention is a grain-oriented electrical steel sheet including a base steel sheet, a forsterite-based primary film disposed on a surface of the base steel sheet, and a phosphate-based tension-imparting film containing no chromium, which is disposed on a surface of the primary film,
  in which, in a case where a Ti content and a S content in the forsterite-based primary film are respectively expressed as XTi and XS, by mass %,
  XTi/XS that is a ratio of the Ti content to the S content satisfies Expression (1),
  XTi+XS that is a sum of the Ti content and the S content satisfies Expression (2), and
  a strain-introduced magnetic domain control is performed, $0.10 \leq XTi/XS \leq 10.00$  Expression (1)

$XTi+XS \geq 0.10$ mass %.  Expression (2)

[2] A method for manufacturing a grain-oriented electrical steel sheet according to another aspect of the present invention is a method for manufacturing the grain-oriented electrical steel sheet according to [1], the method including
  a hot rolling step of heating a slab and then performing hot rolling on the slab to obtain a hot-rolled steel sheet,
  a hot-rolled sheet annealing step of performing hot-rolled sheet annealing on the hot-rolled steel sheet to obtain an annealed steel sheet,
  a cold rolling step of performing cold rolling on the annealed steel sheet to obtain a cold-rolled steel sheet,
  a decarburization-annealing step of performing decarburization-annealing on the cold-rolled steel sheet to obtain a decarburization-annealed steel sheet,
  a final annealing step of applying an annealing separating agent onto a surface of the decarburization-annealed steel sheet and heating the applied annealing separating agent, thereby obtaining a forsterite-based primary film and obtain a final annealed steel sheet,
  a tension-imparting film forming step of applying and baking a coating liquid on a surface of the final annealed steel sheet to form a phosphate-based tension-imparting film containing no chromium, and
  a magnetic domain control step of performing a strain-introduced magnetic domain control on a steel sheet on which the phosphate-based tension-imparting film containing no chromium is formed,
  in which the annealing separating agent contains MgO as a main component and contains 1.0 part by mass or more and 15.0 parts by mass or less of a Ti-containing compound in terms of $TiO_2$ and 0.20 parts by mass or more and 10.0 parts by mass or less of a S-containing compound in terms of CaS with respect to 100 parts by mass of MgO in the annealing separating agent, and
  the coating liquid contains a mixture containing two or more among a group consisting of aluminum phosphate, magnesium phosphate, nickel phosphate, cobalt phosphate, and barium phosphate, contains 40 to 70 parts by mass of colloidal silica, optionally contains 2 to 50 parts by mass of phosphoric acid, and contains no chromium with respect to 100 parts by mass of the mixture in terms of solid content.

Effects of the Invention

According to the above-described aspect of the present invention, it is possible to provide a grain-oriented electrical steel sheet having a phosphate-based tension-imparting film containing no chromium in which the iron loss is effectively reduced by performing a strain-introduced magnetic domain control and a preferable method for manufacturing the grain-oriented electrical steel sheet. According to the above-described aspect of the present invention, even when the subject of the strain-introduced magnetic domain control is a grain-oriented electrical steel sheet having a phosphate-based tension-imparting film containing no chromium, it is possible to effectively reduce the iron loss of the grain-oriented electrical steel sheet. Therefore, it is possible to obtain a grain-oriented electrical steel sheet not only exhibiting an excellent environment preservation effect without containing chromium, but also exhibiting an excellent iron loss reduction effect by a synergistic effect of the reduction of the iron loss due to the film structure including the forsterite-based primary film and the phosphate-based tension-imparting film containing no chromium and the reduction of the iron loss due to the strain-introduced magnetic domain control.

EMBODIMENTS OF THE INVENTION

The present inventors found that, in spite of the fact that a strain-introduced magnetic domain control is applied to a grain-oriented electrical steel sheet having a phosphate-based tension-imparting film containing no chromium, in a case where a forsterite-based primary film contains desired amounts of Ti and S, the iron loss reduction effect improves.

The reason for the iron loss reduction effect being improved by appropriately adjusting the contents of Ti and S contained in the forsterite-based primary film even in the case of performing the strain-introduced magnetic domain control on the grain-oriented electrical steel sheet having the phosphate-based tension-imparting film containing no chromium is presumed as follows.

In the case of performing the strain-introduced magnetic domain control on a grain-oriented electrical steel sheet having a phosphate-based tension-imparting film containing chromium, it is considered that chromium in the tension-imparting film enables laser irradiation, electron beam heating, or the like to effectively develop an action of leaving strains in the steel sheet. In contrast, in the case of performing the strain-introduced magnetic domain control on a grain-oriented electrical steel sheet having a phosphate-based tension-imparting film containing no chromium, it is considered that laser irradiation, electron beam heating, or the like does not sufficiently develop the action of leaving strains in the steel sheet.

Meanwhile, in a case where the phosphate-based tension-imparting film containing no chromium is provided on a base steel sheet, it is considered that, when a forsterite-based primary film that is the lower layer of the tension-imparting film is caused to contain an appropriate amount of Ti and S, Ti and S enable laser irradiation, electron beam heating, or the like to effectively develop the action of leaving strains in the steel sheet.

A grain-oriented electrical steel sheet according to the present embodiment is a grain-oriented electrical steel sheet including a base steel sheet, a forsterite-based primary film disposed on a surface of the base steel sheet, and a phosphate-based tension-imparting film containing no chromium, which is disposed on a surface of the primary film, in which, in a case where a Ti content and a S content in the forsterite-based primary film are respectively expressed as XTi and XS, by mass %, XTi/XS that is a ratio of the Ti content to the S content satisfies Expression (1), XTi+XS that is a sum of the Ti content and the S content satisfies Expression (2), and a strain-introduced magnetic domain control is performed.

$$0.10 \leq XTi/XS \leq 10.00 \quad \text{Expression (1)}$$

$$XTi+XS \geq 0.10 \text{ mass \%}. \quad \text{Expression (2)}$$

In addition, the grain-oriented electrical steel sheet according to the present embodiment can be manufactured by a manufacturing method including a hot rolling step of heating a slab and then performing hot rolling on the slab to obtain a hot-rolled steel sheet, a hot-rolled sheet annealing step of performing hot-rolled sheet annealing on the hot-rolled steel sheet to obtain an annealed steel sheet, a cold rolling step of performing cold rolling on the annealed steel sheet to obtain a cold-rolled steel sheet, a decarburization-annealing step of performing decarburization-annealing on the cold-rolled steel sheet to obtain a decarburization-annealed steel sheet, a final annealing step of applying an annealing separating agent onto a surface of the decarburization-annealed steel sheet and heating the applied annealing separating agent, thereby obtaining a forsterite-based primary film and obtain a final annealed steel sheet, a tension-imparting film forming step of applying and baking a coating liquid on a surface of the final annealed steel sheet to form a phosphate-based tension-imparting film containing no chromium, and a magnetic domain control step of performing a strain-introduced magnetic domain control on a steel sheet on which the phosphate-based tension-imparting film containing no chromium is formed, in which the annealing separating agent contains MgO as a main component and contains 1.0 part by mass or more and 15.0 parts by mass or less of a Ti-containing compound in terms of $TiO_2$ and 0.20 parts by mass or more and 10.0 parts by mass or less of a S-containing compound in terms of CaS with respect to 100 parts by mass of MgO in the annealing separating agent, and the coating liquid contains a mixture containing two or more among a group consisting of aluminum phosphate, magnesium phosphate, nickel phosphate, cobalt phosphate, and barium phosphate, contains 40 to 70 parts by mass of colloidal silica, optionally contains 2 to 50 parts by mass of phosphoric acid, and contains no chromium with respect to 100 parts by mass of the mixture in terms of a solid content.

Hereinafter, the grain-oriented electrical steel sheet according to the present embodiment (hereinafter, abbreviated as "grain-oriented electrical steel sheet" in some cases) and a manufacturing method therefor will be described.

It should be noted that, in the following description, in the case of expressing a numerical range as "the lower limit value to the upper limit value", it means that the numerical range is "the lower limit value or more and the upper limit value or less" unless particularly otherwise specified.

Figure 1:
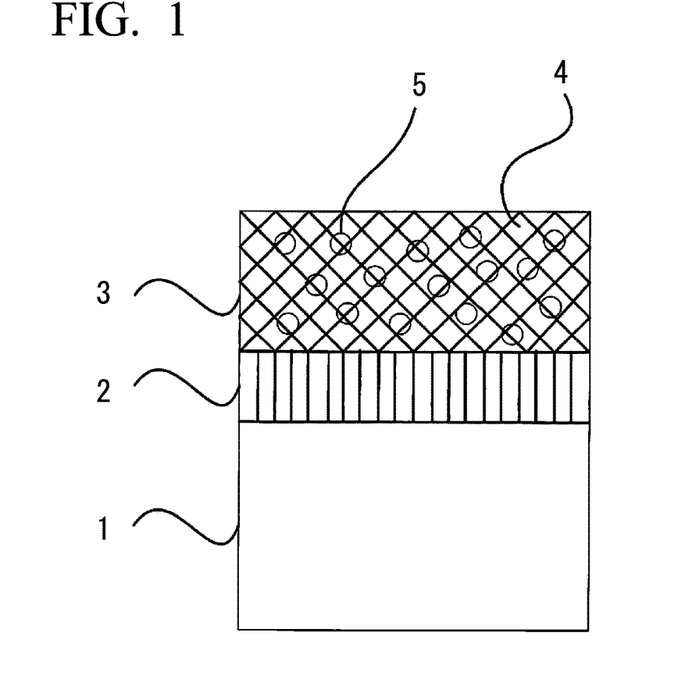
FIG. 1 is a view schematically showing the film structure of a grain-oriented electrical steel sheet according to the present embodiment.

FIG. 1 is a view schematically showing the film structure of the grain-oriented electrical steel sheet according to the present embodiment. As shown in FIG. 1, the grain-oriented electrical steel sheet according to the present embodiment has a layer configuration where a forsterite-based primary film 2 and a phosphate-based tension-imparting film containing no chromium 3 are laminated in this order on a surface of a base steel sheet 1. In addition, although not shown in FIG. 1, the grain-oriented electrical steel sheet according to the present embodiment is subjected to a strain-introduced magnetic domain control. Hereinafter, the layer configuration of the grain-oriented electrical steel sheet according to the present embodiment will be described in detail. It should be noted that, in the following description, reference symbols in the drawings will be omitted except in the case of mentioning the drawings.

[Base Steel Sheet]

The chemical composition, metallographic structure, and the like of the base steel sheet are not particularly limited as long as the magnetization easy axis is aligned in a certain direction and the grain-oriented electrical steel sheet according to the present embodiment functions as a grain-oriented electrical steel sheet.

The chemical composition of the base steel sheet is not particularly limited, but preferably contains, by mass %, for example, Si: 0.8% to 7.0%,
C: more than 0% and 0.085% or less,
acid-soluble Al: 0% to 0.065%,
N: 0% to 0.012%,
Mn: 0% to 1%,
Cr: 0% to 0.3%,
Cu: 0% to 0.4%,
P: 0% to 0.5%,
Sn: 0% to 0.3%,
Sb: 0% to 0.3%,
Ni: 0% to 1%,
S: 0% to 0.03%, and
Se: 0% to 0.015%, and
the remainder consists of Fe and an impurity.

The chemical composition of the base steel sheet is a chemical composition preferable for controlling the base steel sheet to a Goss texture where crystal orientations are piled up in a {110}<001> orientation.

It should be noted that the above-described chemical composition is a chemical composition measured at a depth where the chemical composition of the base steel sheet is stable.

Among the elements in the base steel sheet, Si and C are essential elements. Acid-soluble Al is an element that is preferably contained in order to obtain a high-efficiency GO material (a grain-oriented electrical steel sheet having excellent magnetic characteristics). N, Mn, Cr, Cu, P, Sn, Sb, Ni, S, and Se are optional elements. Since these optional elements may be contained according to the purpose, it is not necessary to limit the lower limit value, and the lower limit value may be 0%. In addition, even when these optional elements are contained as impurities, an effect obtained by the grain-oriented electrical steel sheet according to the present embodiment is not impaired. The chemical composition of the base steel sheet consists of, in addition to the essential elements and the optional elements, Fe and impurities that are the remainder.

It should be noted that, in the present embodiment, the "impurity" means an element that is inevitably mixed from an ore as a raw material, a scrap, the manufacturing environment, or the like at the time of industrially manufacturing the base steel sheet.

In addition, the grain-oriented electrical steel sheet ordinarily undergoes purification annealing (final annealing) at the time of secondary recrystallization. In the purification annealing, an inhibitor-forming element is discharged to the outside of the system. Particularly, the contents of N and S significantly decrease, and the N content and the S content after final annealing become 50 ppm or less. Under normal final annealing conditions, the N content and the S content after final annealing become 20 ppm or less, or furthermore, 10 ppm or less.

The chemical composition of the base steel sheet may be measured by an ordinary analysis method of steel. For example, the chemical composition of the base steel sheet may be measured using inductively coupled plasma-atomic emission spectrometry (ICP-AES). Specifically, the chemical composition can be specified by, for example, acquiring a 35 mm×35 mm test piece from the position of the center of the sheet thickness of the base steel sheet after the removal of the films (the primary film and the tension-imparting film) and measuring the chemical composition with ICPS-8100 or the like (measuring instrument) manufactured by Shimadzu Corporation under conditions based on a calibration curve prepared in advance. It should be noted that C and S may be measured using an infrared absorption method after combustion, and N may be measured using an inert gas melting-thermal conductivity method. Acid-soluble Al may be measured using a filtrate obtained after the decomposition by heating of a sample with an acid.

It should be noted that the films may be removed by immersing the test piece in a NaOH aqueous solution, heating the NaOH aqueous solution to 80° C. to remove the tension-imparting film, and then immersing the test piece in 10% dilute sulfuric acid at 80° C. for 3 minutes to dissolve the primary film.

[Method for Manufacturing Base Steel Sheet (Decarburization-Annealed Steel Sheet)]

The method for manufacturing the base steel sheet is not particularly limited, and it is possible to manufacture the base steel sheet by appropriately selecting a well-known conventional method for manufacturing a grain-oriented electrical steel sheet. A preferable specific example is, for example, a manufacturing method including (1) a hot rolling step of performing hot rolling by heating a slab having the above-described chemical composition to 1000° C. or higher to obtain a hot-rolled steel sheet, (2) a hot-rolled sheet annealing step of performing hot-rolled sheet annealing where the hot-rolled steel sheet is heated to 1000° C. to 1200° C. on the hot-rolled steel sheet to obtain an annealed steel sheet, (3) a cold rolling step of performing cold rolling once or twice or more, including process annealing, on the annealed steel sheet to obtain a cold-rolled steel sheet, and (4) a decarburization-annealing step of performing decarburization-annealing where the cold-rolled steel sheet is heated to 700° C. to 900° C. in, for example, a wet hydrogen-inert gas atmosphere on the cold-rolled steel sheet to obtain a decarburization-annealed steel sheet.

The manufacturing method may include a nitriding annealing step during the decarburization-annealing step or after the decarburization-annealing step as necessary. The conditions for nitriding annealing may be ordinary conditions. Examples thereof include a condition under which the cold-rolled steel sheet is annealed in an atmosphere containing a gas having a nitriding ability such as ammonia, a condition under which a decarburization-annealed steel sheet coated with an annealing separating agent containing a powder having a nitriding capability such as MnN is final annealed at 1000° C. or higher, and the like.

In the present embodiment, the thickness (sheet thickness) of the base steel sheet is not particularly limited, but is preferably 0.10 mm or more and 0.50 mm or less, and more preferably 0.15 mm or more and 0.40 mm or less.

[Forsterite-Based Primary Film]

The forsterite-based primary film (simply referred to as the primary film in some cases) is disposed on a surface (single surface or both surfaces) of the above-described base steel sheet. The primary film contains forsterite ($Mg_2SiO_4$) as a main component. In the present embodiment, the primary film contains Ti and S. In addition, as other components, the primary film may contain B, C, N, Cr, Mn, Fe, and the like.

The thickness (film thickness) of the primary film is not particularly limited. However, when the primary film is too thin, a thermal stress relaxation effect is not sufficiently developed, and it is not possible to secure the adhesion of the tension-imparting film. Therefore, the thickness of the primary film is preferably 0.5 μm or more and more preferably 1.0 μm or more. On the other hand, when the primary film is too thick, the thickness becomes uneven, and a defect such as a void or a crack is generated in the primary film. Therefore, the thickness of the primary film is preferably 5 μm or less and more preferably 4 μm or less.

The primary film is preferably as thin as possible as long as the adhesion of the tension-imparting film can be secured since it is possible to suppress a decrease in space factor at the time of using grain oriented electrical steel sheet as an iron core. Therefore, the thickness of the primary film is still more preferably 3 μm or less and far still more preferably 2 μm or less.

The thickness of the primary film can be measured by observing a sheet thickness cross section of the grain-oriented electrical steel sheet with a scanning electron microscope (SEM) or a transmission electron microscope (TEM). Specifically, for example, for SEM observation, a sample is cut out from the grain-oriented electrical steel sheet so as to have an observation cross section parallel to the sheet thickness direction, five or more measurement positions that are 2 μm or more apart from each other in the width direction are selected from a measurement region that is 10 μm or more wide in a direction parallel to the surface of the base steel sheet and includes the primary film, the base steel sheet, and the tension-imparting film in the observation cross section of the sample, the thickness of the primary film is measured at the measurement positions, and the average value is regarded as the thickness of the primary film. At that time, when a COMPO image for which a backscattered electron is used, contrast appears between the base steel sheet, the primary film, and the tension-imparting film that have different chemical compositions, which makes differentiation easy.

In the present embodiment, for Ti and S in the forsterite-based primary film, the ratio of the Ti content to the S content ($X_{Ti}/X_S$) satisfies Expression (1), and the sum ($X_{Ti}+X_S$) of the Ti content and the S content satisfies Expression (2).

$$0.10 \leq X_{Ti}/X_S \leq 10.00 \quad \text{Expression (1)}$$

$$X_{Ti}+X_S \geq 0.10 \text{ mass \%.} \quad \text{Expression (2)}$$

As described above, in a case where the relationships of Expression (1) and Expression (2) are satisfied between the Ti content and the S content, even when chromium is not present in the tension-imparting film, Ti and S enable laser irradiation, electron beam heating, or the like to effectively develop an action of leaving strains in the steel sheet at the time of performing a strain-introduced magnetic domain control.

Here, Ti in the primary film is contained in the primary film in a state of a compound containing Ti. As the compound containing Ti, for example, TiS, TiN, TiC, $TiO_2$, and the like can be exemplified.

In addition, S in the primary film is contained in the primary film in a state of a compound containing S. As the compound containing S, for example, not only TiS, which is the Ti compound and is also S, but also MgS, MnS, CaS, BaS, and the like can be exemplified. Here, in the present embodiment, since it is preferable to contain Ti and S in the primary film as much as the desired relationships are satisfied, the presence aspects of Ti and S in the primary film are not particularly specified.

The Ti content (mass %) and the S content (mass %) in the primary film can be measured by the following method.

A sample collected from the grain-oriented electrical steel sheet is immersed in a NaOH aqueous solution, the NaOH aqueous solution is heated to 80° C. to remove the tension-imparting film, and then the sample is immersed in 10% dilute sulfuric acid at 80° C. for 3 minutes to dissolve the primary film. The Ti content and the S content are measured from a solution in which the primary film is dissolved by the inductively coupled plasma (ICP) method, thereby obtaining the mass of Ti and the S content in the primary film. The obtained Ti content and the obtained S content are divided by the mass of the primary film that can be acquired by obtaining the difference between the mass before the removal of the primary film and the mass after the removal of the primary film, thereby obtaining the Ti content and the S content, by mass %.

The contents of Ti and S in the primary film are not particularly limited as long as the relationships of Expression (1) and Expression (2) are satisfied, but the Ti content may be set to 0.01 mass % to 2.50 mass %, and the S content may be set to 0.01 mass % to 1.50 mass %. The Ti content in the primary film may be set to 0.20 mass % or more or 0.70 mass % or more. In addition, the Ti content in the primary film may be set to 2.00 mass % or less, 1.50 mass % or less, or 1.00 mass % or less. The S content in the primary film may be set to 0.20 mass % or more or 0.50 mass % or more. In addition, the S content in the primary film may be set to 1.20 mass % or less or 1.00 mass % or less.

The ratio of the Ti content to the S content in the primary film (XTi/XS) is adjusted to 0.10 to 10.00 according to Expression (1). In a case where XTi/XS is less than 0.10, there is a case where the iron loss reduction effect of the strain-introduced magnetic domain control cannot be sufficiently obtained. In a case where XTi/XS exceeds 10.00, the iron loss improvement effect of the strain-introduced magnetic domain control by a laser or an electron beam becomes small, and thus there is a case where the iron loss of the grain-oriented electrical steel sheet becomes poorer. XTi/XS is preferably 0.50 or more and more preferably 1.00 or more. In addition, XTi/XS is preferably 5.00 or less and more preferably 3.00 or less.

The sum (XTi+XS) of the Ti content and the S content in the primary film is adjusted to 0.10 mass % or more according to Expression (2). In a case where XTi+XS is less than 0.10 mass %, there is a case where the iron loss reduction effect of the strain-introduced magnetic domain control cannot be sufficiently obtained. XTi+XS is preferably 0.20 mass % or more, 0.30 mass % or more, or 0.50 mass % or more and more preferably 1.00 mass % or more. The upper limit of XTi+XS is not particularly limited, but may be set to 2.70 mass % or less or 2.50 mass % or less in consideration of the relationship with the preferable Ti content and the preferable S content.

[Annealing Separating Agent]

As the annealing separating agent for forming the primary film, it is possible to use an annealing separating agent that contains MgO as a main component and contains 1.0 part by mass or more and 15.0 parts by mass or less of a Ti-containing compound in terms of $TiO_2$ and 0.20 parts by mass or more and 10.0 parts by mass or less of a 5-containing compound in terms of CaS with respect to 100 parts by mass of MgO in the annealing separating agent. In the present embodiment, the expression "containing MgO as a main component" means that MgO is the majority of the annealing separating agent by parts by mass, that is, 50 mass % or more of the annealing separating agent is MgO.

The primary film according to the present embodiment can be formed by using an annealing separating agent containing a Ti-containing compound and a S-containing compound in the above amounts and appropriately controlling the degree of oxidation of the atmosphere and the flow rate of the atmospheric gas during final annealing.

It should be noted that the amount of the Ti-containing compound in terms of $TiO_2$ refers to the amount of $TiO_2$ in the case of assuming that the Ti-containing compound contained in the annealing separating agent is all $TiO_2$. In addition, the amount of the S-containing compound in terms of CaS refers to the amount of CaS in the case of assuming that the S-containing compound contained in the annealing separating agent is all CaS.

The Ti content and the S content in the annealing separating agent do not match the Ti content and the S content contained in the primary film of the grain-oriented electrical steel sheet. This is because the Ti content and the S content in the primary film are reduced by purification annealing (final annealing). After final annealing, the Ti content becomes 5% to 30% of the Ti content before final annealing. After final annealing, the S content becomes 5% or less of the S content before final annealing. In the present embodiment, it is possible to obtain a primary film containing desired amounts of Ti and S by compositely and indivisibly controlling the amounts of the Ti-containing compound and the S-containing compound in the annealing separating agent and the degree of oxidation of the atmosphere and the flow rate during final annealing.

The Ti compounds exemplified as Ti contained in the primary film can be exemplified as the Ti-containing compound used in the annealing separating agent. Since it becomes easy to adjust the Ti content and the S content in the annealing separating agent, TiS is preferably contained as the Ti-containing compound and the 5-containing compound in the annealing separating agent.

As described above, the amount of the Ti-containing compound in the annealing separating agent is 1.0 part by mass or more and 15.0 parts by mass or less in terms of $TiO_2$ with respect to 100 parts by mass of MgO in the annealing separating agent. In addition, the amount of the Ti-containing compound is more preferably 3.0 parts by mass or more and 10.0 parts by mass or less.

When the amount of the Ti-containing compound is set to 1.0 part by mass or more in terms of $TIO_2$ with respect to 100 parts by mass of MgO in the annealing separating agent, it is possible to enhance the iron loss improvement effect of the strain-introduced magnetic domain control. When the amount of the Ti-containing compound is set to 15.0% parts by mass or less with respect to 100 parts by mass of MgO in the annealing separating agent, it is possible to prevent iron loss deterioration caused by the excessive formation of the primary film.

The S compounds provided as exemplary examples of S contained in the primary film can be, similarly, be provided as exemplary examples of the S-containing compound used in the annealing separating agent.

As described above, the amount of the S-containing compound in the annealing separating agent is 0.20 part by mass or more and 10.0 parts by mass or less in terms of CaS with respect to 100 parts by mass of MgO in the annealing separating agent. In addition, the amount of the S-containing compound is more preferably 0.20 parts by mass or more and 1.0 part by mass or less.

When the amount of the S-containing compound is set to 0.20 parts by mass or more in terms of CaS with respect to 100 parts by mass of MgO in the annealing separating agent, it is possible to secure the adhesion of the primary film. When the amount of the S-containing compound is set to 10.0 parts by mass or less in terms of CaS with respect to 100 parts by mass of MgO in the annealing separating agent, it is possible to prevent iron loss deterioration caused by the excessive formation of the primary film.

[Method for Forming Primary Film (Final Annealing Conditions)]

The annealing separating agent having the above-described composition is applied to the base steel sheet that has been subjected to decarburization-annealing (decarburization-annealed steel sheet) and heated to perform final annealing, and then the annealing separating agent is removed, thereby forming the primary film on the decarburization-annealed steel sheet. As the heating conditions for final annealing, for example, the heating speed may be set to 5° C./h to 100° C./h, the heating temperature may be set to 1000° C. to 1300° C., and the heating time at 1000° C. to 1300° C. may be set to 10 hours to 50 hours. Here, in the final annealing, it is necessary to appropriately control the degree of oxidation of the atmosphere and the flow rate of the atmospheric gas such that the Ti content and the S content in the primary film satisfy the desired relationships. In the final annealing, the degree of oxidation of the atmosphere is set to $10^{-3}$ to 1 in terms of the partial pressure ratio of $PH_2O/PH_2$, and the flow rate of the atmospheric gas is set to 3.0 to 10.0 $Nm^3$/Hr. Here, as the degree of oxidation of the atmosphere, an actual measurement value or simulation value of a tight coil between the steel sheets is used.

[Phosphate-Based Tension-Imparting Film containing No Chromium]

The phosphate-based tension-imparting film containing no chromium (simply referred to as the tension-imparting film in some cases) is disposed on the primary film. The tension-imparting film may be appropriately selected and used from well-known tension-imparting films, and, even for tension-imparting films that are not well-known, there is no particular limitation as long as the tension-imparting films are a phosphate-based tension-imparting film containing no chromium. It should be noted that, in the present embodiment, the expression "containing no chromium" means that the chromium content in a raw material (coating liquid) for forming the tension-imparting film is 1 mass ppm or less, and the chromium content in the tension-imparting film is 1 mass ppm or less. The chromium content in the tension-imparting film may be measured by a method in which a solution where the tension-imparting film is dissolved is investigated by a chemical analysis, a method in which the solution is investigated by cross-sectional observation with SEM and energy-dispersive X-ray analysis (EDX), or the like.

Ordinarily, phosphate-based tension-imparting films containing no chromium have a film structure as shown in FIG. 1. In the film structure shown in FIG. 1, the tension-imparting film 3 has a matrix structure in which a component 5 for improving film characteristics required for the tension-imparting film such as tensile tension, low heat expansibility, and insulation properties is dispersed or dissolved in a film substrate (matrix) 4 made from non-crystalline phosphate such as aluminum phosphate or magnesium phosphate. A typical structure of the tension-imparting film 3 is a matrix structure in which colloidal silica particles are dispersed in a phosphate-based matrix.

The phosphate-based tension-imparting film containing no chromium preferably contains a component capable of imparting film characteristics such as the moisture absorption resistance, adhesion, and fusion resistance during the strain relieving annealing of the films (the primary film and the tension-imparting film) instead of chromium. For example, the component that substitutes chromium is appropriately selected from boric acid, a boron compound other than boric acid, a metal sulfate, an oxide colloid, and the like, and this component is added to the coating liquid for forming the tension-imparting film. The tension-imparting film obtained by applying and baking such a coating liquid on the primary film contains the added component as it is or a different component generated from a reaction of the component caused during baking.

The thickness of the tension-imparting film is not particularly limited. However, when the thickness of the tension-imparting film is too thin, tension imparted to the steel sheet becomes small, and the insulation properties also degrade. Therefore, the thickness of the tension-imparting film is preferably 0.1 μm or more and more preferably 0.5 μm or more. On the other hand, when the thickness of the tension-imparting film exceeds 10 μm, there is a case where a crack is generated in the tension-imparting film in the stage of forming the tension-imparting film. Therefore, the thickness of the tension-imparting film is preferably 10 μm or less and more preferably 5 μm or less.

The thickness of the tension-imparting film can be measured by observing a cross section of the film with a scanning electron microscope (SEM) or a transmission electron microscope (TEM). Specifically, the thickness may be measured by the same method as for the thickness of the primary film.

As the coating liquid for forming the phosphate-based tension-imparting film containing no chromium, it is possible to use a coating liquid that contains phosphate as an essential component and appropriately contains a component containing no chromium that is capable of imparting tension and/or insulation properties to the film as an additional component. Specifically, it is possible to use a coating liquid that contains a mixture containing two or more among a group consisting of aluminum phosphate, magnesium phosphate, nickel phosphate, cobalt phosphate, and barium phosphate, contains 40 to 70 parts by mass of colloidal silica, optionally contains 2 to 50 parts by mass of phosphoric acid, and contains no chromium with respect to 100 parts by mass of the mixture in terms of the solid content (the amount of the solid content of a residue obtained by removing moisture from the coating liquid state).

Patent Documents 2, 4, 5, and 6 describe coating liquids for forming the phosphate-based tension-imparting film containing no chromium, and these coating liquids may be used as the coating liquid in the present embodiment. In addition, the non-chromium component described in each of these patent documents may also be appropriately combined.

(1) Coating Liquid described in Patent Document 2

A coating treatment liquid containing 20 parts by mass of colloidal silica in terms of the $SiO_2$ solid content, 10 to 120 parts by mass of aluminum phosphate in terms of $Al(H_2PO_4)_3$, 2 to 10 parts by mass of boric acid, a total of 4 to 40 parts by mass of any one or more selected from the respective sulfates of Mg, Al, Fe, Co, Ni, and Zn.

(2) Coating Liquid described in Patent Document 4

A coating liquid in which 0.3 to 15 parts by mass of one or more oxide colloidal substances are contained with respect to 100 parts by mass of primary phosphates of Al, Mg, and Ca and 35 to 100 parts by mass of colloidal silica in terms of the solid content and one or more compounds made of any element of Mg, Ca, Ba, Sr, Zr, Fe, Mn, Co, Ni, Cu, Zn, Al, Si, and B are used as the oxide colloidal substances.

(3) Coating Liquid described in Patent Document 5

A coating liquid in which 1 to 25 parts by mass of one or more boron compounds are contained with respect to 100 parts by mass of primary phosphates of Al, Mg, and Ca and 35 to 100 parts by mass of colloidal silica in terms of the solid content and compounds made of any one or more elements of Li, Na, K, Mg, Mn, Ca, Ba, Sr, Zr, Fe, Co, Ni, Cu, Zn, Al, and O in addition to boron are used as the boron compounds.

(4) Coating Liquid described in Patent Document 6

A coating liquid in which 0.1 to 5 parts by mass of one or more organic acid salts of Ca, Mn, Fe, Mg, Zn, Co, Ni, Cu, B, and Al are contained as a metal element with respect to 100 parts by mass of primary phosphates of Al, Mg, and Ca and 35 to 100 parts by mass of colloidal silica in terms of the solid content and formate, acetate, oxalate, tartrate, lactate, citrate, succinate, or salicylate, or any combination thereof is used as the organic acid salts.

A coating liquid as described above is applied and baked on the final annealed steel sheet, thereby forming the phosphate-based tension-imparting film containing no chromium. The heating conditions in annealing for forming the tension-imparting film may be ordinary conditions, and, for example, the heating temperature may be set to 700° C. to 1000° C., and the heating time at 700° C. to 1000° C. may be set to 5 seconds to 120 seconds.

[Strain-Introduced Magnetic Domain Control]

In the present embodiment, after the forsterite-based primary film containing desired amounts of Ti and S and the phosphate-based tension-imparting film containing no chromium are provided in this order on the base steel sheet, a strain-introduced magnetic domain control is performed on the grain-oriented electrical steel sheet.

The strain-introduced magnetic domain control is performed on the grain-oriented electrical steel sheet by laser irradiation, electron beam heating, or the like, and minute strains having a directionality perpendicular or substantially perpendicular to the rolling direction (conveyance direction) are repeatedly imparted at predetermined intervals in the rolling direction, thereby refining magnetic domains.

Figure 2:
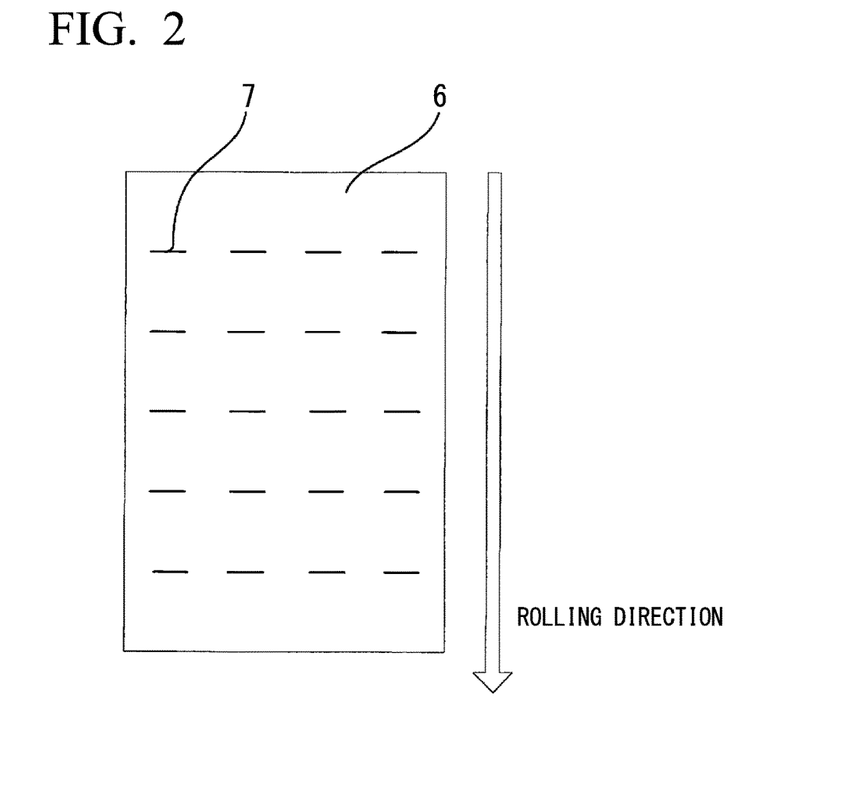
FIG. 2 is a view schematically showing an example of a strain-introduced magnetic domain control and a structure where linear strains that extend in a direction perpendicular or substantially perpendicular to a rolling direction are repeatedly disposed at constant cycles in the rolling direction on the grain-oriented electrical steel sheet.

FIG. 2 is an example of the strain-introduced magnetic domain control. In this example, in order to refine magnetic domains, strains 7 that are linear in a direction perpendicular or substantially perpendicular to the rolling direction (conveyance direction) are repeatedly disposed at constant cycles (at regular intervals) in the rolling direction on the grain-oriented electrical steel sheet 6.

Figure 3:
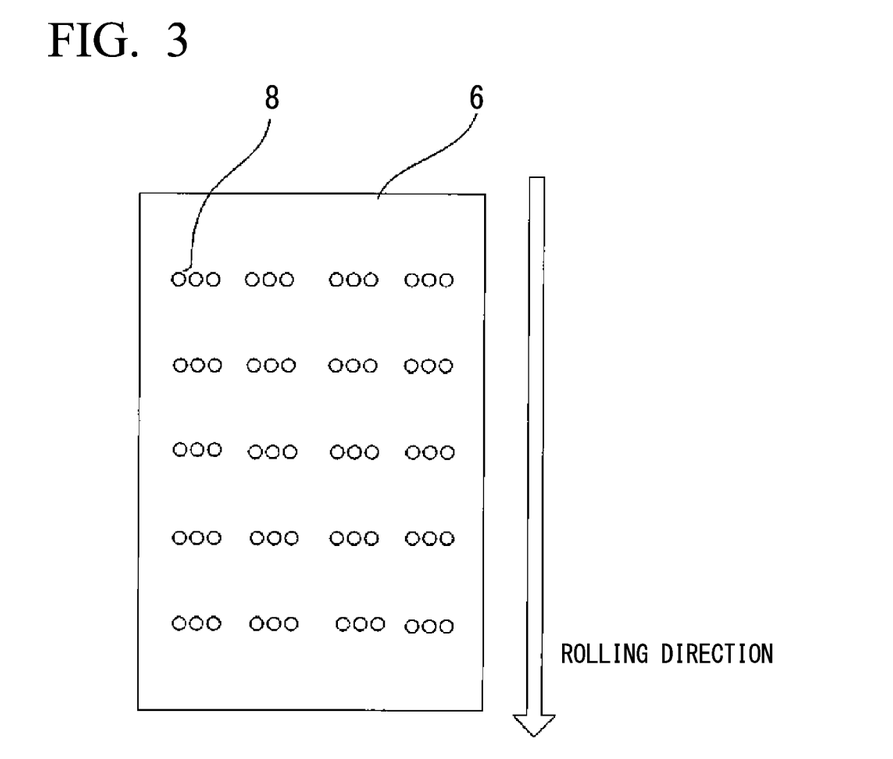
FIG. 3 is a view schematically showing another example of the strain-introduced magnetic domain control and a structure where a group of dot-shaped strains that are arrayed in the direction perpendicular or substantially perpendicular to the rolling direction is repeatedly disposed at constant cycles in the rolling direction on the grain-oriented electrical steel sheet.

In addition, FIG. 3 is another example of the strain-introduced magnetic domain control. In this example, in order to refine magnetic domains, a group 8 of dot-shaped strains that are linearly arrayed along a direction perpendicular or substantially perpendicular to the rolling direction is repeatedly disposed at constant cycles in the rolling direction on the grain-oriented electrical steel sheet 6.

The strain-introduced magnetic domain control is a non-destructive magnetic domain control and imparts non-destructive strains to the base steel sheet by laser irradiation, electron beam heating, or the like. The strain-introduced magnetic domain control is disclosed in, for example, Patent Document 7 or Patent Document 8.

In the present embodiment, the strain-introduced magnetic domain control is advantageous since a high-speed process is possible. In addition, since laser irradiation or electron beam heating is a non-contact process, it is possible to stably perform a uniform process by controlling the power or the like of a laser or an electron beam.

In the case of performing the strain-introduced magnetic domain control by laser irradiation, for example, a YAG laser, a $CO_2$ laser, a fiber laser, or the like may be used as the laser. As the laser irradiation conditions, the output may be set to approximately 10 to 5000 W, the irradiation diameter in the rolling direction may be set to 10 to 500 μm, the irradiation diameter in an orthogonal-to-rolling direction may be set to 10 to 5000 μm, and the scanning speed in the orthogonal-to-rolling direction may be set to 5 to 100 m/sec.

In the case of performing the strain-introduced magnetic domain control by electron beam heating, for example, as the type of an electron beam, an electron gun in which an ordinary thermal electron beam source is used may be used, and, as the irradiation conditions of the electron beam, the output may be set to approximately 10 to 2000 W, the acceleration voltage of the electron beam may be set to 30 to 200 kV, the amount of an irradiation current may be set to 0.5 to 20 mA, a 0.1 to 0.5 mm circular beam may be used as the irradiation beam, and the scanning speed in the orthogonal-to-rolling direction may be set to 5 to 100 m/sec.

Whether or not the strain-introduced magnetic domain control is performed on the grain-oriented electrical steel sheet can be confirmed by checking the occurrence of iron loss deterioration of 5% or more at the time of performing strain relieving annealing (a typical example is the holding of the grain-oriented electrical steel sheet at 800° C. for 2 hours), measuring a partial change in the lattice constant of an irradiated radiation portion by X-ray diffraction, measuring the spread of the half width of a diffraction line from the irradiated radiation portion, or the like. In the present embodiment, the expression "the strain-introduced magnetic domain control is performed" means that the iron loss is reduced by 5% or more by strain relieving annealing where the grain-oriented electrical steel sheet is held at 800° C. for 2 hours.

The grain-oriented electrical steel sheet according to the present embodiment described above has the forsterite-based primary film containing desired amounts of Ti and S and the phosphate-based tension-imparting film containing no chromium in this order on the base steel sheet and is subjected to the strain-introduced magnetic domain control. The grain-oriented electrical steel sheet according to the present embodiment is capable of improving the iron loss reduction effect in spite of the fact that the strain-introduced magnetic domain control is applied to the grain-oriented electrical steel sheet having the tension-imparting film containing no chromium.

The present invention is not limited to the above-described embodiment. The above-described embodiment is an example, and any matters having substantially the same configuration and exhibiting the same action and effect as the technical idea described in the claims of the present invention are included in the technical scope of the present invention.

EXAMPLES

Hereinafter, the present invention will be specifically described with exemplary examples and comparative examples. In the following description, conditions in the examples are condition examples adopted to confirm the feasibility and effect of the present invention, and the present invention is not limited to these condition examples. The present invention is capable of adopting a variety of conditions as long as the object of the present invention is achieved without departing from the gist of the present invention.

[Testing Method]

(1) Measurement of W17/50 [W/kg]

W17/50 was measured as the index of the iron loss of a grain-oriented electrical steel sheet.

The value of iron loss generated in the grain-oriented electrical steel sheet when excited with an alternating-magnetization so as to form a sinusoidal wave having a maximum magnetic flux density of 1.7 T at a frequency of 50 Hz was measured with a single sheet magnetic measuring instrument (SST).

(2) Method for Measuring Ti Content and S Content in Forsterite-Based Primary Film A sample collected from the grain-oriented electrical steel sheet was immersed in a NaOH aqueous solution, heated to 80° C. to remove the tension-imparting film, and then immersed in 10% dilute sulfuric acid at 80° C. for 3 minutes, thereby dissolving the primary film portion. The Ti content and the S content were measured by the ICP method from this dissolved solution. The obtained Ti content and the obtained S content were divided by the mass of the primary film that was acquired by obtaining the difference between the mass before the removal of the primary film and the mass after the removal amount of the primary film, thereby obtaining the Ti content and the S content, by mass %.

Comparative Examples 1 to 3 and Examples 1 to 3

A slab having a chemical composition containing, by mass %, Si: 3.35%, C: 0.075%, Mn: 0.062%, acid-soluble Al: 0.029%, N: 0.0082%, and S: 0.024% with a remainder consisting of Fe and an impurity was heated up to 1400° C. to perform hot rolling, thereby obtaining a hot-rolled steel sheet having a thickness of 2.3 mm. Hot-rolled sheet annealing was performed on this hot-rolled steel sheet at 1100° C. to obtain an annealed steel sheet. After that, cold rolling was performed on the annealed steel sheet to obtain a cold-rolled steel sheet having a thickness of 0.27 mm. Decarburization-annealing where the cold-rolled steel sheet was held at 840° C. for 120 seconds was performed for the purpose of primary recrystallization and decarburization, thereby obtaining a decarburization-annealed steel sheet. As the atmosphere for the decarburization-annealing, a wet hydrogen-inert gas atmosphere was used, and the atmosphere was humidified to obtain an appropriate oxygen potential.

An annealing separating agent containing MgO as a main component was applied (8 g/m$^2$) and dried on a single surface of the obtained decarburization-annealed steel sheet, and then final annealing where the decarburization-annealed steel sheet was heated at 1200° C. for 20 hours was performed for the purpose of secondary recrystallization and the formation of a forsterite-based primary film, thereby obtaining a final annealed steel sheet. The temperature rising rate during the final annealing was set to 20° C./h. Here, the flow rate of the atmospheric gas during the temperature rise up to 1200° C. in the final annealing was set to 5.0 Nm$^3$/Hr in the atmospheric flow rate No. 1 and was set to 2.5 Nm$^3$/Hr in the atmospheric flow rate No. 2. In addition, the degree of oxidation of the atmosphere during the final annealing was set to 0.3 in terms of the partial pressure ratio $PH_2O/PH_2$ at 900° C.

At the time of applying the annealing separating agent, the TiS concentration in the annealing separating agent was changed as follows. It should be noted that the TiS content, the Ti content in terms of TiO$_2$, and the S content in terms of CaS in Table 1 are expressed by parts by mass with respect to 100 parts by mass of MgO in the annealing separating agent.

TABLE 1

| | Annealing separating agent No. | TiS content (per 100 parts by mass of MgO) | Ti-containing compound in terms of TiO$_2$ (per 100 parts by mass of MgO) | S-containing compound in terms of CaS (per 100 parts by mass of MgO) |
|---|---|---|---|---|
| Comparative Example 1 | No. 1 | 0.0 Parts by mass | 0.0 Parts by mass | 0.0 Parts by mass |
| Comparative Example 2 | No. 1 | 0.0 Parts by mass | 0.0 Parts by mass | 0.0 Parts by mass |
| Comparative Example 3 | No. 3 | 3.0 Parts by mass | 2.9 Parts by mass | 2.7 Parts by mass |
| Example 1 | No. 2 | 1.0 Part by mass | 1.0 Part by mass | 0.91 Parts by mass |
| Example 2 | No. 3 | 3.0 Parts by mass | 2.9 Parts by mass | 2.7 Parts by mass |
| Example 3 | No. 4 | 5.0 Parts by mass | 4.8 Parts by mass | 4.5 Parts by mass |

A coating liquid containing no chromium was applied to the obtained final annealed steel sheet and baked to form a tension-imparting film. As the heating conditions in annealing for the formation of the tension-imparting film, the heating temperature was set to 700° C. to 1000° C., and the heating time at 700° C. to 1000° C. was set to 5 seconds to 120 seconds. After that, a magnetic domain control treatment was performed by laser irradiation. In Examples 1 to 3 and Comparative Examples 1 to 3, a coating liquid that contained a mixture containing two or more among a group consisting of aluminum phosphate, magnesium phosphate, and barium phosphate and contained 40 to 70 parts by mass of colloidal silica with respect to 100 parts by mass of the mixture in terms of the solid content was used.

In the laser irradiation, a 300 W fiber laser was used, and an oblong irradiation beam that was 100 μm in irradiation diameter in the rolling direction and was 1000 μm in irradiation diameter in an orthogonal-to-rolling direction was radiated at irradiated radiation intervals of 4 mm in the rolling direction. The scanning speed in the orthogonal-to-rolling direction was 25 m/sec. It should be noted that, in Comparative Example 2, laser irradiation was not performed.

For the grain-oriented electrical steel sheet manufactured by the above-described method, the iron loss evaluation (W17/50) and the measurement of the Ti content (mass %) and the S content (mass %) in the forsterite-based primary film and the chromium content in the tension-imparting film were performed by the above-described methods. As a result, in Examples 1 to 3 where the annealing separating agents No. 2, 3, and 4 were used, respectively, the ratio (XTi/XS) of the Ti content and the S content in the forsterite-based primary film satisfied Expression (1), and the sum (XTi+XS) of the Ti content and the S content satisfied Expression (2), and the iron loss was reduced more than in Comparative Examples 1 to 3. It should be noted that, in Examples 1 to 3 and Comparative Examples 1 to 3, the chromium content in the tension-imparting film was 1 mass ppm or less (the detection limit or less). In addition, the chemical composition of the base steel sheet in Examples 1 to 3 contained, by mass %, Si: 0.8% to 7.0%, C: more than 0% and 0.085% or less, Mn: 0% to 1%, acid-soluble Al: 0% to 0.065%, N: 0% to 0.012%, S: 0% to 0.03%, and the remainder consisting of Fe and an impurity.

$$0.10 \leq XTi/XS \leq 10.00 \quad \text{Expression (1)}$$

$$XTi+XS \geq 0.10 \text{ mass \%.} \quad \text{Expression (2)}$$

0.026%, N: 0.0078%, and S: 0.025% with a remainder consisting of Fe and an impurity was heated up to 1360° C. to perform hot rolling, and a hot-rolled steel sheet having a thickness of 2.2 mm was obtained. Hot-rolled sheet annealing was performed on this hot-rolled steel sheet at 1100° C. to obtain an annealed steel sheet. After that, cold rolling was performed on the annealed steel sheet to obtain a cold-rolled steel sheet having a thickness of 0.23 mm. Decarburization-annealing where the cold-rolled steel sheet was held at 830° C. for 120 seconds was performed for the purpose of primary recrystallization and decarburization, thereby obtaining a decarburization-annealed steel sheet. As the atmosphere for the decarburization-annealing, a wet hydrogen-inert gas atmosphere was used, and the atmosphere was humidified to obtain an appropriate oxygen potential.

An annealing separating agent containing MgO as a main component was applied (7 g/m$^2$) and dried on a single surface of the obtained decarburization-annealed steel sheet, and then final annealing where the decarburization-annealed steel sheet was heated at 1200° C. for 20 hours was performed for the purpose of secondary recrystallization and the formation of a forsterite-based primary film. The temperature rising rate during the final annealing was set to 5° C./h to 100° C./h. Here, the flow rate of the atmospheric gas during heating for the final annealing was set to 6.0 Nm$^3$/Hr, and the degree of oxidation of the atmosphere was set to 0.4 in terms of the partial pressure ratio $PH_2O/PH_2$ at 900° C.

At the time of applying the annealing separating agent, the TiS concentration in the annealing separating agent was changed as follows.

TABLE 2

| | Annealing separating agent No. | Atmospheric flow rate No. | TiS content (per 100 parts by mass of MgO) | XTi (mass %) | XS (mass %) | XTi/XS | XTi + XS (mass %) | W17/50 (W/kg) |
|---|---|---|---|---|---|---|---|---|
| Comparative Example 1 | No. 1 | No. 1 | 0.0 Parts by mass | 0.01 | 0.01 | 1.00 | 0.02 | 0.84 |
| Comparative Example 2 | No. 1 | No. 1 | 0.0 Parts by mass | 0.01 | 0.01 | 1.00 | 0.02 | 0.90 |
| Comparative Example 3 | No. 3 | No. 2 | 3.0 Parts by mass | 0.07 | 0.75 | 0.09 | 0.82 | 0.87 |
| Example 1 | No. 2 | No. 1 | 1.0 Part by mass | 0.20 | 0.30 | 0.67 | 0.50 | 0.80 |
| Example 2 | NO. 3 | No. 1 | 3.0 Parts by mass | 0.72 | 0.50 | 1.44 | 1.22 | 0.77 |
| Example 3 | NO. 4 | No. 1 | 5.0 Parts by mass | 1.46 | 0.66 | 2.21 | 2.12 | 0.78 |

Comparative Examples 4 to 6 and Examples 4 to 6

A slab having a chemical composition containing, by mass %, Si: 3.3%, C: 0.082%, Mn: 0.083%, acid-soluble Al:

It should be noted that the TiS content, the Ti content in terms of TiO$_2$, and the S content in terms of CaS in Table 3 are expressed by parts by mass with respect to 100 parts by mass of MgO in the annealing separating agent.

TABLE 3

| | Annealing separating agent No. | TiS content (per 100 parts by mass of MgO) | Ti-containing compound in terms of TiO$_2$ (per 100 parts by mass of MgO) | S-containing compound in terms of CaS (per 100 parts by mass of MgO) |
|---|---|---|---|---|
| Comparative Example 4 | No. 1 | 0.0 Parts by mass | 0.0 Parts by mass | 0.0 Parts by mass |
| Comparative Example 5 | No. 1 | 0.0 Parts by mass | 0.0 Parts by mass | 0.0 Parts by mass |
| Comparative Example 6 | No. 5 | 0.0 Parts by mass | 0.0 Parts by mass | 2.7 Parts by mass |
| Example 4 | No. 3 | 1.0 Part by mass | 2.9 Parts by mass | 2.7 Parts by mass |
| Example 5 | No. 3 | 3.0 Parts by mass | 2.9 Parts by mass | 2.7 Parts by mass |
| Example 6 | No. 4 | 5.0 Parts by mass | 4.8 Parts by mass | 4.5 Parts by mass |

A coating liquid containing no chromium was applied to the obtained final annealed steel sheet. As the heating conditions in annealing for the formation of the tension-imparting film, the heating temperature was set to 700° C. to 1000° C., and the heating time at 700° C. to 1000° C. was set to 5 seconds to 120 seconds. After that, the coating liquid was baked to form a tension-imparting film, and then a magnetic domain control treatment was performed by laser irradiation. In Examples 4 to 6 and Comparative Examples 4 to 6, a coating liquid that contained a mixture containing two or more among a group consisting of aluminum phosphate, magnesium phosphate, and nickel phosphate and contained 40 to 70 parts by mass of colloidal silica with respect to 100 parts by mass of the solid matter in terms of the solid content was used.

In the laser irradiation, a 400 W fiber laser was used, and an oblong irradiation beam that was 90 μm in irradiation diameter in the rolling direction and was 1000 μm in irradiation diameter in an orthogonal-to-rolling direction was radiated at irradiated radiation intervals of 4 mm in the rolling direction. The scanning speed in the orthogonal-to-rolling direction was 30 m/sec. Here, in the laser condition No. 1, the laser power was set to 200 W, and, in the laser condition No. 2, the laser power was set to 400 W.

For the grain-oriented electrical steel sheet manufactured by the above-described method, the iron loss evaluation (W17/50) and the measurement of the Ti content (mass %) and the S content in the forsterite-based primary film and the chromium content in the tension-imparting film were performed. As a result, in Examples 4 to 6 where the annealing separating agents No. 3 and 4 were used, the ratio (XTi/XS) of the Ti content and the S content in the forsterite-based primary film satisfied Expression (1), and the sum (XTi+XS) of the Ti content and the S content satisfied Expression (2), and the iron loss was reduced more than in Comparative Examples 4 and 5. In addition, in Example 5 where the strain-introduced magnetic domain control was performed under the laser condition No. 2 in which the laser power was higher than in the laser condition No. 1, the iron loss was reduced more than in Examples 4 and 6 where the strain-introduced magnetic domain control was performed under the laser condition No. 1. It should be noted that, in Examples 4 to 6 and Comparative Examples 4 to 6, the chromium content in the tension-imparting film was 1 mass ppm or less (the detection limit or less). In addition, the chemical composition of the base steel sheet in Examples 4 to 6 contained, by mass %, Si: 0.8% to 7.0%, C: more than 0% and 0.085% or less, Mn: 0% to 1%, acid-soluble Al: 0% to 0.065%, N: 0% to 0.012%, S: 0% to 0.03%, and the remainder consisting of Fe and an impurity.

INDUSTRIAL APPLICABILITY

According to the above-described aspect of the present invention, it is possible to provide a grain-oriented electrical steel sheet having a tension-imparting film containing no chromium in which the iron loss is effectively reduced by performing a strain-introduced magnetic domain control and a preferable method for manufacturing the grain-oriented electrical steel sheet. According to the above-described aspect of the present invention, even when the subject of the strain-introduced magnetic domain control is a grain-oriented electrical steel sheet having a phosphate-based tension-imparting film containing no chromium, it is possible to effectively reduce the iron loss of the grain-oriented electrical steel sheet. Therefore, obtained is a grain-oriented electrical steel sheet not only exhibiting an excellent environment preservation effect without containing chromium, but also exhibiting an excellent iron loss reduction effect by a synergistic effect of the reduction of the iron loss due to the film structure included the forsterite-based primary film and the phosphate-based tension-imparting film containing no chromium and the reduction of the iron loss due to the strain-introduced magnetic domain control.

BRIEF DESCRIPTION OF THE REFERENCE SYMBOLS

1 Base steel sheet
2 Primary film
3 Tension-imparting film
4 Film substrate (matrix)
5 Component (dispersed or dissolved in matrix)
6 Grain-oriented electrical steel sheet
7 Linear strain
8 A group of dot-shaped strains arrayed

What is claimed is:

1. A grain-oriented electrical steel sheet comprising:
a base steel sheet;
a forsterite-based primary film disposed on a surface of the base steel sheet; and
a phosphate-based tension-imparting film containing no chromium, which is disposed on a surface of the primary film,
wherein, in a case where a Ti content and a S content in the forsterite-based primary film are respectively expressed as XTi and XS, by mass %,
XTi/XS that is a ratio of the Ti content to the S content satisfies Expression (1),
XTi+XS that is a sum of the Ti content and the S content satisfies Expression (2), and

TABLE 4

|  | Annealing separating agent No. | Laser condition No. | TiS content (per 100 parts by mass of MgO) | XTi (mass %) | XS (mass %) | XTi/XS | XTi + XS (mass %) | W17/50 (W/kg) |
|---|---|---|---|---|---|---|---|---|
| Comparative Example 4 | No. 1 | No. 1 | 0.0 Parts by mass | 0.01 | 0.01 | 1.00 | 0.02 | 0.82 |
| Comparative Example 5 | No. 1 | No. 2 | 0.0 Parts by mass | 0.01 | 0.01 | 1.00 | 0.02 | 0.78 |
| Comparative Example 6 | No. 5 | No. 2 | 0.0 Parts by mass | 0.01 | 0.50 | 0.02 | 0.51 | 0.81 |
| Example 4 | No. 3 | No. 1 | 1.0 Part by mass | 0.72 | 0.50 | 1.44 | 1.22 | 0.76 |
| Example 5 | No. 3 | No. 2 | 3.0 Parts by mass | 0.72 | 0.50 | 1.44 | 1.22 | 0.72 |
| Example 6 | No. 4 | No. 1 | 5.0 Parts by mass | 1.46 | 0.66 | 2.21 | 2.12 | 0.74 | a strain-introduced magnetic domain control is performed, $$0.10 \leq XTi/XS \leq 10.00, \quad \text{Expression (1)}$$

$$XTi+XS \geq 0.10 \text{ mass \%}, \quad \text{Expression (2)}$$

wherein the grain-oriented electrical steel sheet has an iron loss (W17/50) of 0.72 W/kg to 0.77 W/kg.

2. A method for manufacturing the grain-oriented electrical steel sheet according to claim 1, the method comprising:
a hot rolling step of heating a slab and then performing hot rolling on the slab to obtain a hot-rolled steel sheet;
a hot-rolled sheet annealing step of performing hot-rolled sheet annealing on the hot-rolled steel sheet to obtain an annealed steel sheet;
a cold rolling step of performing cold rolling on the annealed steel sheet to obtain a cold-rolled steel sheet;
a decarburization-annealing step of performing decarburization-annealing on the cold-rolled steel sheet to obtain a decarburization-annealed steel sheet;
a final annealing step of applying an annealing separating agent onto a surface of the decarburization-annealed steel sheet and heating the applied annealing separating agent, thereby obtaining a forsterite-based primary film and obtain a final annealed steel sheet;
a tension-imparting film forming step of applying and baking a coating liquid on a surface of the final annealed steel sheet to form a phosphate-based tension-imparting film containing no chromium; and
a magnetic domain control step of performing a strain-introduced magnetic domain control on a steel sheet on which the phosphate-based tension-imparting film containing no chromium is formed,
wherein the annealing separating agent contains MgO as a main component and contains 1.0 part by mass or more and 15.0 parts by mass or less of a Ti-containing compound in terms of $TiO_2$ and 0.20 parts by mass or more and 10.0 parts by mass or less of a S-containing compound in terms of CaS with respect to 100 parts by mass of MgO in the annealing separating agent, and
the coating liquid contains a mixture containing two or more among a group consisting of aluminum phosphate, magnesium phosphate, nickel phosphate, cobalt phosphate, and barium phosphate, contains 40 to 70 parts by mass of colloidal silica, optionally contains 2 to 50 parts by mass of phosphoric acid, and contains no chromium with respect to 100 parts by mass of the mixture in terms of a solid content.

* * * * *